(12) United States Patent
Adams et al.

(10) Patent No.: US 11,379,610 B2
(45) Date of Patent: Jul. 5, 2022

(54) METHODS AND DEVICES FOR AUTOMATICALLY ENCRYPTING FILES

(71) Applicant: BlackBerry Limited, Waterloo (CA)

(72) Inventors: Neil Patrick Adams, Waterloo (CA); Robert Joseph Lombardi, Hamilton (CA); Jasmin Mulaosmanovic, Kitchener (CA)

(73) Assignee: BlackBerry Limited, Waterloo (CA)

( * ) Notice: Subject to any disclaimer, the term of this patent is extended or adjusted under 35 U.S.C. 154(b) by 237 days.

(21) Appl. No.: 16/507,537

(22) Filed: Jul. 10, 2019

(65) Prior Publication Data
US 2021/0012027 A1 Jan. 14, 2021

(51) Int. Cl.
*G06F 21/62* (2013.01)
*H04W 12/30* (2021.01)

(52) U.S. Cl.
CPC ........ *G06F 21/6245* (2013.01); *H04W 12/30* (2021.01); *G06F 2221/2107* (2013.01); *G06F 2221/2111* (2013.01); *G06F 2221/2151* (2013.01)

(58) Field of Classification Search
CPC ........ G06F 21/6245; G06F 2221/2107; G06F 2221/2111; G06F 2221/2157; H04W 12/30
See application file for complete search history.

(56) References Cited

U.S. PATENT DOCUMENTS

| 10,607,027 | B1 * | 3/2020 | Ben Naim | H04L 9/14 |
| 2003/0191938 | A1 * | 10/2003 | Woods | G06F 21/6209 713/165 |
| 2006/0005017 | A1 * | 1/2006 | Black | H04L 9/0891 713/165 |
| 2006/0075228 | A1 * | 4/2006 | Black | H04L 63/104 713/167 |
| 2007/0283150 | A1 * | 12/2007 | Cozianu | H04L 63/0428 713/168 |
| 2012/0096257 | A1 * | 4/2012 | Li | G06F 21/6218 713/150 |
| 2015/0326570 | A1 * | 11/2015 | Publicover | H04N 5/247 726/4 |
| 2016/0078245 | A1 * | 3/2016 | Amarendran | H04L 63/0428 713/193 |
| 2016/0132694 | A1 * | 5/2016 | Dhoolia | G06F 21/602 713/165 |
| 2016/0171239 | A1 * | 6/2016 | Li | G06F 21/6245 713/189 |
| 2019/0050592 | A1 * | 2/2019 | Grau | G06F 21/629 |

FOREIGN PATENT DOCUMENTS

CN 106326773 1/2019

OTHER PUBLICATIONS

Extended European Search Report dated Oct. 1, 2020, EP Application No. 20184594.8.

* cited by examiner

*Primary Examiner* — Jason Chiang
(74) *Attorney, Agent, or Firm* — Rowand LLP (57) ABSTRACT

An automatic file encryption method and device for automatically encrypting a file. A processor identifies a characteristic associated with likely sensitive content based on a usage pattern of encrypting files having the characteristic. Creation of a new file is detected and the newly-created file is analyzed to determine whether the file contains sensitive content based upon it having the characteristic. If the file is found to have the characteristic, then the file is automatically encrypted.

18 Claims, 5 Drawing Sheets

METHODS AND DEVICES FOR AUTOMATICALLY ENCRYPTING FILES

FIELD

The present application generally relates to data security, and more particularly, to ensuring privacy of sensitive files.

BACKGROUND

As the use of computing devices becomes more ubiquitous in all facets of life users are increasingly turning to mobile computing devices for both personal and business activities. Such activities often involve the creation and/or saving of various types of files, such as, for example, a sports fan taking a photo with their smartphone, or a banker downloading a financial document to their tablet PC. In some cases, files of a sensitive or confidential nature (both personal and business) are created and/or saved. In some devices, it is possible to encrypt sensitive files stored on the device.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In a first aspect, the present application describes a computing device. The computing device includes a processor; a memory; and an automatic file encryption application stored in the memory and containing processor-executable instructions to automatically encrypt a file. The instructions, when executed by the processor, are to cause the processor to identify a characteristic associated with likely sensitive content based on a usage pattern of encrypting files having the characteristic, detect creation of the file, determine that the file contains sensitive content based upon it having the characteristic, and encrypt the file based on the determination that the file contains sensitive content.

In another aspect, the present application describes a computer-implemented method of automatically encrypting a file stored on a computing device. The method may include identifying a characteristic associated with likely sensitive content based on a usage pattern of encrypting files having the characteristic; detecting creation of the file; determining that the file contains sensitive content based upon it having the characteristic; and encrypting the file based on the determination that the file contains sensitive content.

In yet a further aspect, the present application describes a computer-readable storage medium storing processor-readable instructions that, when executed, configure a processor to perform any of the methods described herein. The computer-readable storage medium may be non-transitory. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application reference may be made to a "file vault" or a "file vaulting" operation. The term "file vault" generally refers to an encrypted portion of memory into which files may be placed to guard against unauthorized access to or exposure of the files. Files within the portion of memory may only be accessed through decrypting the files, which requires passing an authentication operation. The authentication may include inputting a passphrase, biometric, gesture, or other access control data or any combination. In some cases the authentication may be multi-factor authentication. The term "file vaulting" generally refers to moving a file into the "file vault", i.e. moving a file from an unencrypted portion of memory into the encrypted portion of memory. More generally, the present application refers to "encrypting" a file. It will be appreciated that "encrypting" a file may include moving a file from temporary memory or an unencrypted portion of memory to a protected or encrypted portion of memory, and removing any copy of the file from the temporary or unencrypted memory.

As noted above, many users produce or store files and documents on their computing devices, including files and documents of a private nature. These files and documents may be stored by default in an unsecured filesystem by the operating system of the computing device.

This has resulted in a particular security concern for users of such computing devices. A particular vulnerability arises when a new file containing sensitive content is created or added by the user. As the new file is saved in the default unencrypted filesystem, it is susceptible to unauthorized access. Accordingly, some computing devices provide for the ability to encrypt files. In some cases, this includes moving the file from the unencrypted portion of memory, e.g. filesystem, to an encrypted portion of memory, e.g. a file vault. In this sense, moving may include copying the file from unencrypted memory to encrypted memory and deleting or erasing the copy in unencrypted memory. A user that wishes to protect files from unauthorized access may protect them by moving them into the file vault.

Even if the computing device provides the user with functionality to manually move the file to an encrypted file vault, a further vulnerability arises in that the user may neglect to secure sensitive files. Automatically encrypting all files may cause unnecessary computational burden and delay when most files do not require heightened levels of access control. Malicious parties may actively seek out both personal and business confidential files.

Accordingly, in accordance with one aspect of the present application, an automatic file encrypting application is described. The automatic file encrypting application is a software-implemented application that encrypts a file determined to contain sensitive content, for example by copying it to an encrypted file vault and deleting the unencrypted copy. It does so, in one example implementation, by determining that the file contains sensitive content based upon a characteristic of the file. The characteristic may be identified based on a usage pattern in which other files having the same characteristic have been previously encrypted. In one example, the usage pattern is based on the user's history of moving files into the file vault on the computing device. In another example, the usage pattern is based on the history of other users moving files into their respective file vaults on their respective computing devices.

In some implementations, the characteristic may be metadata associated with the file. That is, it may be a feature of the file identifiable through metadata, such as a time or date of creation, a location of creation, etc. In yet other implementations, the characteristic may include content of the file, such as identifiable features within an image or message or document.

More than one characteristic may be factored into the determination that a file contains sensitive content. For example, the determination that a file contains likely sensitive content may be based on a combination of location and time associated with creation of the file. As an illustration, an image having the characteristics of being captured at the location of a nightclub or bar between 23:00 and 3:00 may be determined to contain likely sensitive content.

Figure 1:
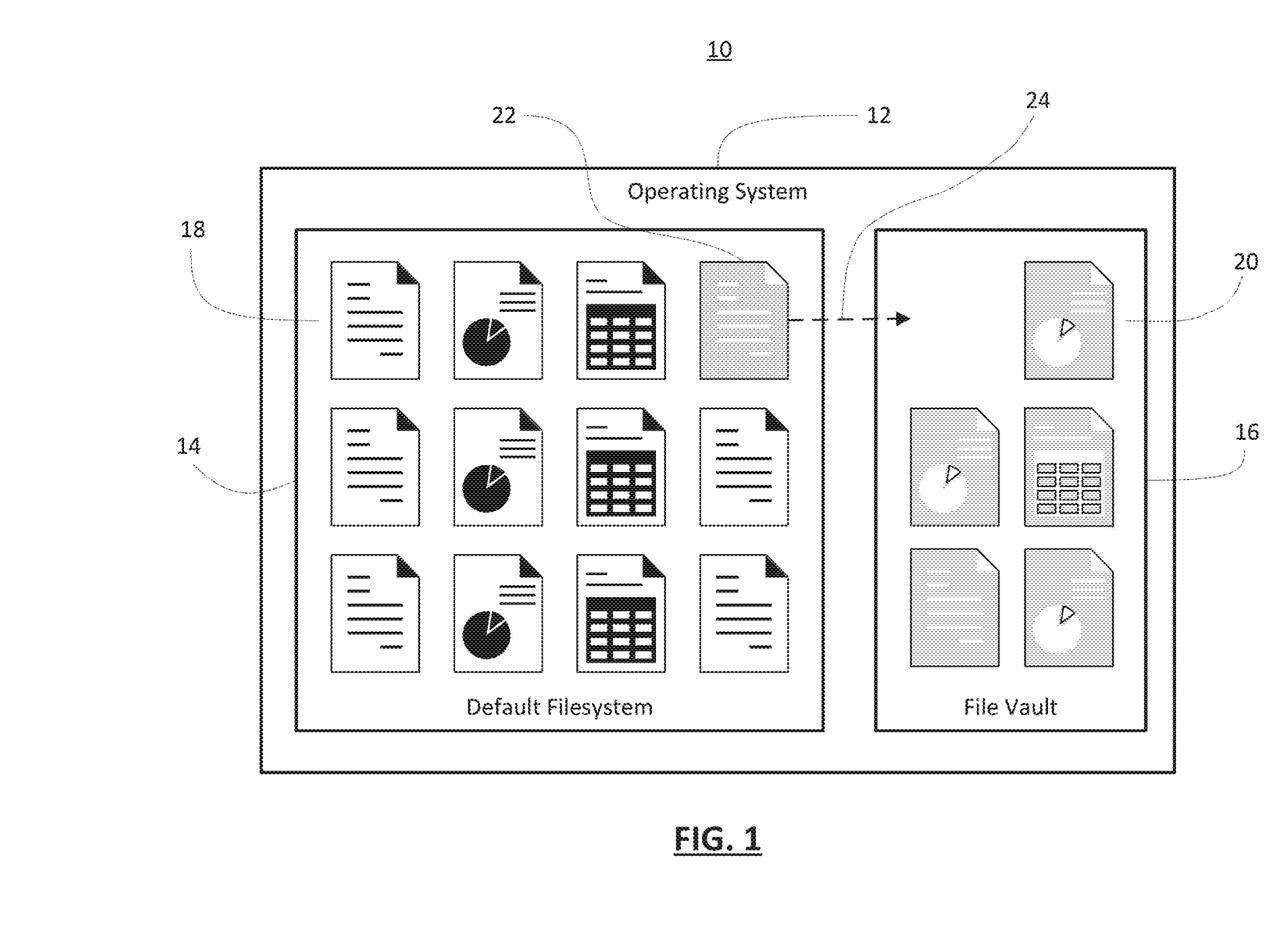
FIG. 1 illustrates, in block diagram form, an example system including a file being moved to encrypted memory.

Reference is first made to FIG. 1, which illustrates an example system 10 that includes an Operating System 12 having a Default Filesystem 14 and a File Vault 16. The Operating System 12 may be any suitable operating system, such as the Android™ operating system, for example. The present application is not limited to any particular operating system provided that the operating system provides access to an encrypted filesystem in addition to a default unencrypted filesystem. The Default Filesystem 14 may include an unencrypted filesystem where files 18 that are initially created or added are saved and/or stored. For example, a user creating a photo file by taking a picture with their smartphone stores the file, by default, in the smartphone's internal storage or memory card. By way of a further example, a user adding a financial document to their laptop PC (by creating or downloading it) stores the document, by default, in the laptop's internal or external disk drive.

The File Vault 16 may include an encrypted filesystem that secures access to the encrypted files 20 therein. As shown in FIG. 1, the File Vault 16 may be a local disk-based file vault. Such local file vault may be, for example, a separate volume or logical drive on the same disk under control of the Operating System 12. In the case of a local file vault, access to the encrypted files 20 stored therein may be secured by means of common security mechanisms, such as a password, a fingerprint, or other biometrics. The File Vault 16 may also be a cloud-based file vault, such as, for example, a remotely hosted secure/encrypted storage service. In the case of a cloud-based file vault, the user's computing device may communicate with the cloud-based file vault using its communications module (as discussed further in relation to FIG. 3), and may require authentication in order to access the stored files.

As illustrated, files 18 are files that were created or added in the Operating System 12 and are, by default, stored in the Default Filesystem 14. Files 18 can be of any type compatible with Operating System 12 such as, for example, media files, messaging files or document files. Media files may include any one or more of an image, a photo, a video, an audio clip, and the like. Messaging files may include any one or more of an email, a text message (SMS), an instant messaging (IM) conversation, and the like. Document files may include any one or more of a text document, a spreadsheet, a presentation, a PDF (portable document format), and any other type of document. The present application is not limited to any particular file type and any file that provides its metadata or other attributes to its host operating system is suitable.

In the example implementation of FIG. 1, the files 18 stored in the Default Filesystem 14 were placed there by default upon their creation or addition to the system. Some of the files 18 may contain sensitive content that a user wishes to keep private. Confidential file 22 is one such file, in this example. However, the system 10 is configured such that it automatically identifies the file 22 as containing sensitive content without user action or input and automatically moves 24 the confidential file 22 from the Default Filesystem 14 to the File Vault 16 based on the determination that the confidential file 22 likely contains sensitive content. Example details of that determination are discussed below.

Figure 2:
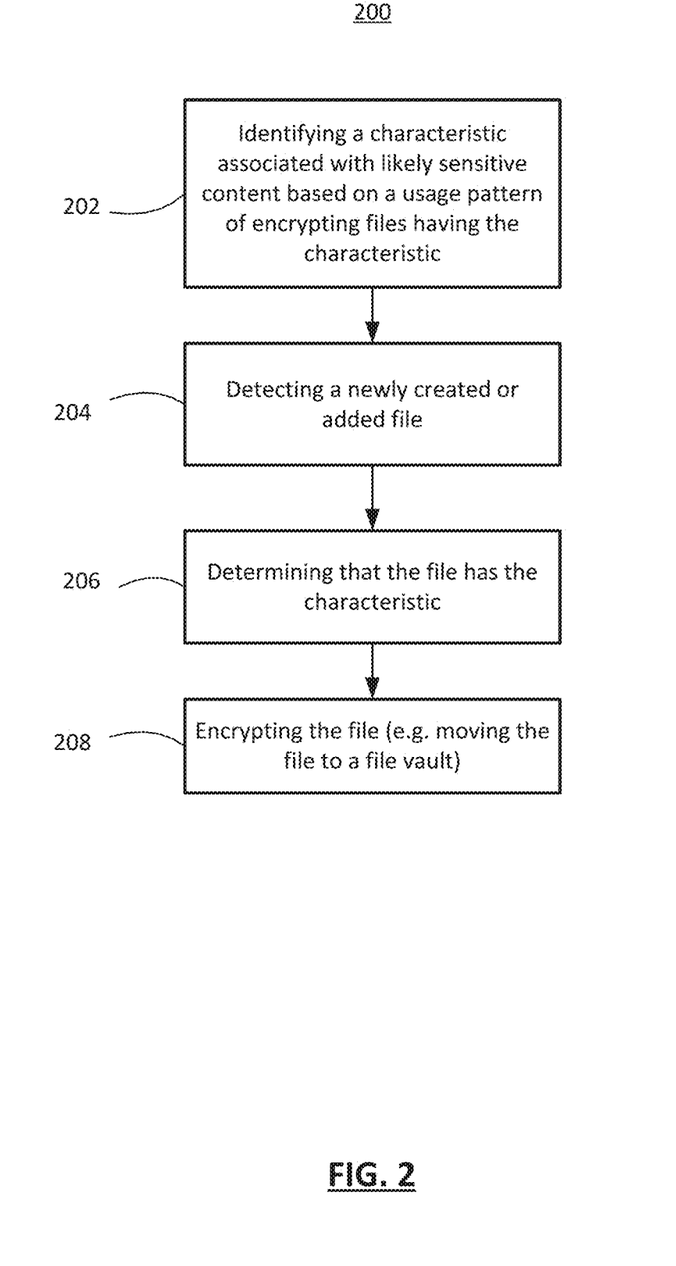
FIG. 2 shows, in flowchart form, an example method of automatically moving a file to encrypted memory.

Reference is now made to FIG. 2, which shows an example method 200 of automatically encrypting a file. The method 200 may, for example, be carried out by an automatic file encrypting application operating on a computing device. The computing device may include a mobile device in some implementations. In some implementations, the computing device may include a tablet, smartwatch, smartphone, e-reader, personal computer, laptop, or any other such computing device.

At operation 202, a characteristic is identified that is associated with likely sensitive content based on previous file encryption operations. That is, a usage pattern is identified whereby other files having the same characteristic have been encrypted. The encryption of the other files may have occurred through user instruction in some implementations. Accordingly, based on a history of encryption of files having the characteristic, the characteristic is identified as being associated with likely sensitive content.

As discussed above, the characteristic may include a characteristic found in metadata associated with the file. The characteristic may also or alternatively include content of the file, including features detected, keywords, etc. The characteristic may include two or more characteristics in combination. Example characteristics are described above and below.

In one example embodiment, the usage pattern is obtained from previous encryption operations carried out on the mobile device. In one example, the usage pattern is based on a history of files the mobile device has previously moved into its encrypted memory in response to user settings or instructions. By analyzing those files previously encrypted, the mobile device identifies a common characteristic of the files indicative of likely sensitive content.

The identification may further be based on determining that the previously encrypted files have the characteristic and that previously unencrypted files do not have the characteristic. That is, a characteristic that is common to the encrypted files may not be indicative of likely sensitive content unless that characteristic is also absent from files that were created and stored in the unencrypted memory but were not moved to the file vault.

The identification may include determining whether one of a plurality of candidate characteristics is present in the previously encrypted files. Certain characteristics may be identified in advance as candidate characteristics, such that the identifying of a characteristic includes looking for one of the candidate characteristics in the usage pattern. As an example, image features of known sensitive things, such as images of a whiteboard, alcohol, nudity, personal identifying information or documents, etc., may be candidate characteristics that are available for identification as a characteristic common to previously encrypted files. Conversely, certain characteristics may be excluded as candidate characteristics. For example, in the case of location associated with a file, a workplace associated with a user may be excluded on the basis that it is a very common location for file creation that cannot indicate sensitivity. On the other hand, for a user in a sensitive position having a workplace with confidentiality restrictions, the workplace location may be indicative of likely sensitive content. As another example, time of creation may be excluded as a characteristic unless the time of creation is at an unusual or unexpected time, such as between 22:00 and 6:00.

In another example embodiment, the usage pattern is based on previous encryption operations carried out on other computing devices. That is, the usage pattern may be "crowd sourced", in that a pattern of other users choosing to encrypt files having a characteristic leads to identification of the characteristic as being associated with likely sensitive content. For example, the usage pattern may indicate that a large percentage of users that capture an image at a certain location choose to encrypt that image. In that case, the usage pattern may indicate that the location is a characteristic associated with sensitive content.

In the case of crowd-sourced usage patterns, in one implementation the identification of the characteristic may be made by the mobile device based on information received from other computing devices regarding their file encryption activity, either directly or via a server. In another implementation the identification of the characteristic may be made by a server analyzing the usage pattern based on information the server receives from the other computing devices regarding their encryption activity. The server then provides the mobile device with data regarding the characteristic to enable the mobile device to carry out the rest of the method 200. It will be appreciated that in the case of crowd-sourced characteristic identification, the actual file previously encrypted may not, for privacy reasons, be provided to the server or the mobile device. Instead, the other mobile devices may send metadata and/or content information regarding the previously-encrypted files to the server, and the server may then determine the characteristic from the commonalities amongst metadata or content information provided by the other mobile devices.

Having identified a characteristic, that characteristic may then be used by the mobile device to identify whether other files should be encrypted, e.g. stored in encrypted memory. It will be appreciated that the characteristic(s) may themselves be sensitive information and that storing the characteristics on the mobile device may be a security risk itself. In that respect, the characteristics may be stored in encrypted form and may be decrypted when evaluating whether a new file should be placed in the vault or not. In some implementations, the characteristics may be hashed to protect against their disclosure. It will be appreciated that in such an implementation the characteristics of a new file may then need to be hashed to see if they match stored hashed characteristics, although hashing may not be effective when evaluating whether a characteristic like time or location falls within a defined range that correlates to sensitive data that should be encrypted.

Referring still to FIG. 1, having identified the characteristic associated with likely sensitive content, the mobile device then detects creation of a file in operation 204. Creation may include detecting a newly-created file generated on the mobile device, such as capture of a new image, video of audio recording, and it may include detecting a newly-added file. Newly-created files could include, for example, a voice note recorded on a smartwatch, a message sent from a personal medical device, etc. Newly-added files could include, for example, receiving a video clip shared with a smartphone via wireless link, receiving usage history at a smart television sent by a service provider, etc. Detecting a newly-created or added-file may involve the subject computing device performing periodic scanning of its default filesystem. Additionally or alternatively, the computing device may provide real-time notification of a newly-created or added file. In one example implementation, the detecting includes scanning for newly-created or added files of one or more specified file type (i.e. only certain relevant file types can be specified) which may have the benefit of reducing processing load on the computing device.

In operation 206, the computing device determines that the file contains sensitive content based on it having the characteristic identified in operation 202. On this basis, in operation 208, the computing device then automatically, without user intervention or instruction, encrypts the file. For example, it may move the file into the encrypted memory space, i.e. the file vault, by copying the file to encrypted memory and deleting the copy from unencrypted memory.

As discussed above, the characteristic indicative of sensitive content is identified based on a usage pattern of previously encrypted files having the characteristic. The characteristic may include metadata for the file, such as geo-location data, and date and/or timestamp data. For example, the characteristic may include the location at which a photo, video, or audio recording is created. The location may be determined, for example, based on metadata associated with the file. The metadata may be stored with the file, for example in a header or other data structure. In one example, the metadata may be associated with the file by a camera application that receives location data from a GPS chip in some examples. Photos that were taken at locations within a threshold distance of each other may be considered to have the same characteristic, in some examples.

It will also be appreciated that identification of a characteristic may be based on a certain percentage of previously-encrypted files of the same type having the characteristic or combination of characteristics. As an example, if the user encrypts images created at a particular location within a particular three-hour time window 80% of the time, then that combination of location and time may be considered a characteristic of likely sensitive content. Similarly, if some percentage, e.g. 50%, of other users that take images at a particular location (or within a threshold distance of that location) encrypt those images, then the location may be characteristic of likely sensitive content.

In some implementations, the characteristic includes content of the file. Content of the file may include, in the case of a photo or video, a feature detected in the photo or video. Example features detected in an image or video may include human faces, a specific person identified through facial recognition, nudity or potential sexual content, alcohol, or personal identifying information or documents, or any other feature that may be detected in an image or video and that may be classed as potentially sensitive. For example, sensitive work content may be indicated by detection of a whiteboard, which may contain confidential writing. Content of a text file may include keywords, such as "secret" or "confidential". When it comes to feature detection, the features identified may be classed according to feature detection algorithms and certain classes may be categorized as potentially sensitive. This would avoid finding a "characteristic" in previously encrypted files that may be common to the files but is actually not correlated with the desire to encrypt the files, such as ordinary and common features like a roadway, furniture, trees, automobiles, or the like.

As described above, the file may be of various file types, and characteristics of the file that are candidate characteristics for establishing a usage pattern may depend on the file type. For example, in the case of a media file, like an image, video or audio recording, the candidate characteristics may include one or more of: an identity of an individual (e.g. mistress); the presence of an object (e.g. alcoholic beverage); and an attribute of either an individual or object (e.g. percentage of skin showing). As another example, if the file is one of various messaging files, then candidate characteristics may include one or more of: an identity of a sender or recipient (e.g. spy agency boss email sender); a date and/or timestamp range (e.g. Friday or Saturday night after 10 PM); the presence of specified text (e.g. "Top Secret"); the presence of an attachment (e.g. photo or video); an identity of an individual in an attachment; the presence of an object in an attachment; and an attribute of either an individual or object in an attachment. In yet a further example, the file may be one of various document file types, in which case the candidate characteristic may include one or more of: a specified title or label (e.g. Project X); and the presence of specified text (e.g. "For your eyes only").

Figure 3:
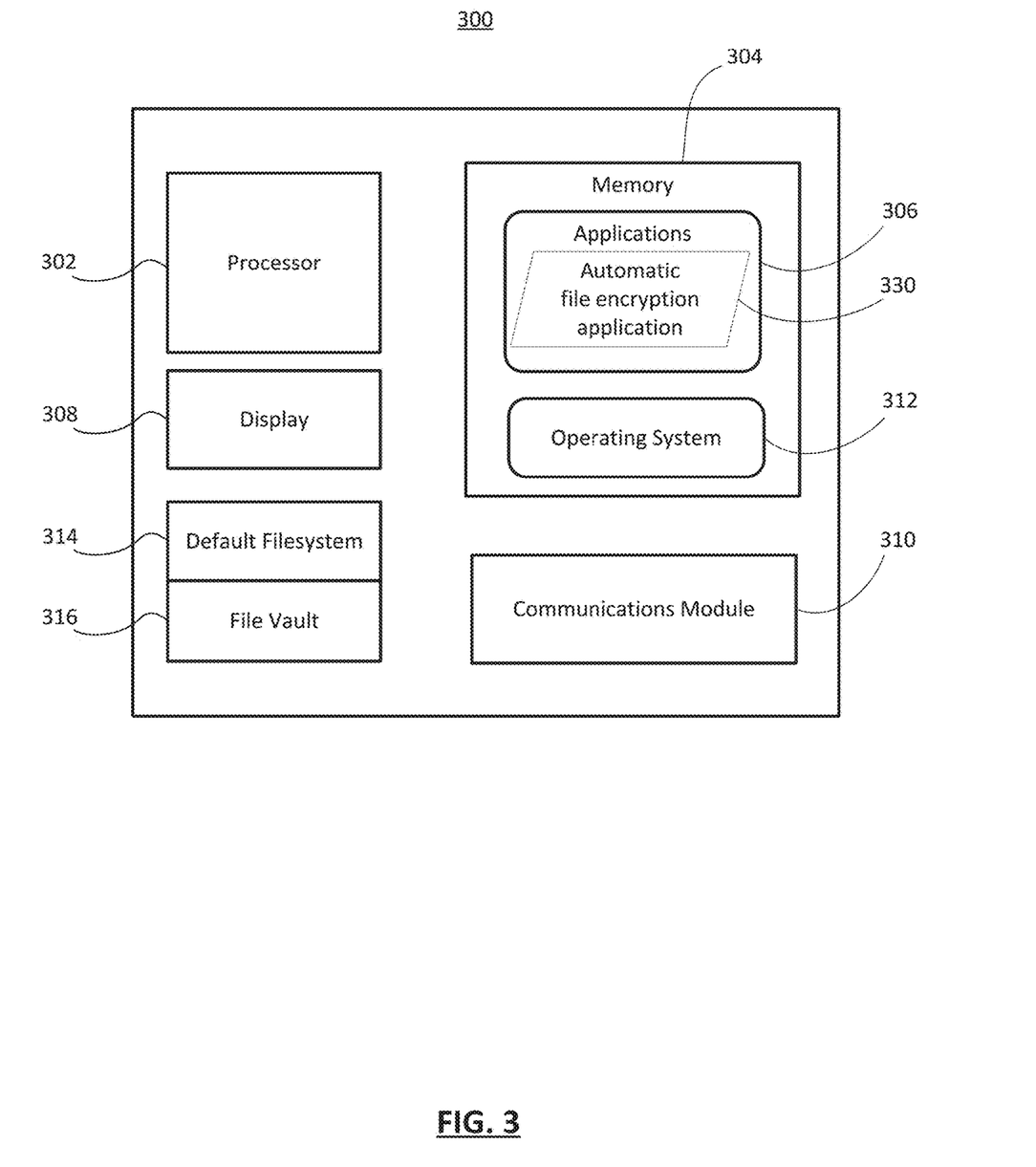
FIG. 3 depicts, in block diagram form, an example computing device configured for automatically moving a file to encrypted memory.

Reference is now made to FIG. 3, which depicts an example computing device 300 implementing an automatic file encryption application 330. The computing device 300 includes a processor 302, which may include one or more processing units, and a memory 304. The computing device 300 further includes a default filesystem 314 and a file vault 316. The memory 304 stores an operating system 312 and applications 306. The operating system 312 and applications 306 contain processor-executable instructions that, when executed by the processor 302, configure the processor 302 to carry out the operations described. The applications 306 may include the automatic file encryption application 330. The automatic file encryption application 330, stored in the memory 304, causes the processor 302 to detect a newly created or added file in the default filesystem 314. The automatic file encryption application 330 then causes the processor 302 to determine that the file contains sensitive content based upon characteristics of the file, and any previously identified patterns in saved determinations. The memory 304 may further save the determination that the file contains sensitive content, including the characteristics of the file. Finally, the automatic file vaulting application 330 causes the processor 302 to encrypt the file, for example by moving the file to an encrypted file vault 316. The computing device 300 may further include a display 308 and a communications module 310. The display 308 may show the user a graphical user interface (GUI) as part of the automatic file encryption application 330. Such GUI may allow the user to interact with the automatic file encryption application 330 in order to set certain preferences, such as, for example, characteristics of a file indicating that it contains sensitive content, or specified file types to include in scanning by the application. As previously described, the communications module 310 may facilitate communication with a cloud-based file vault, and specifically the moving of files determined to contain sensitive content to a cloud-based file fault. Communication and file transfer between the communications module 310 and the cloud-based file vault may take place over any suitable link, such as, for example, the internet.

Figure 4:
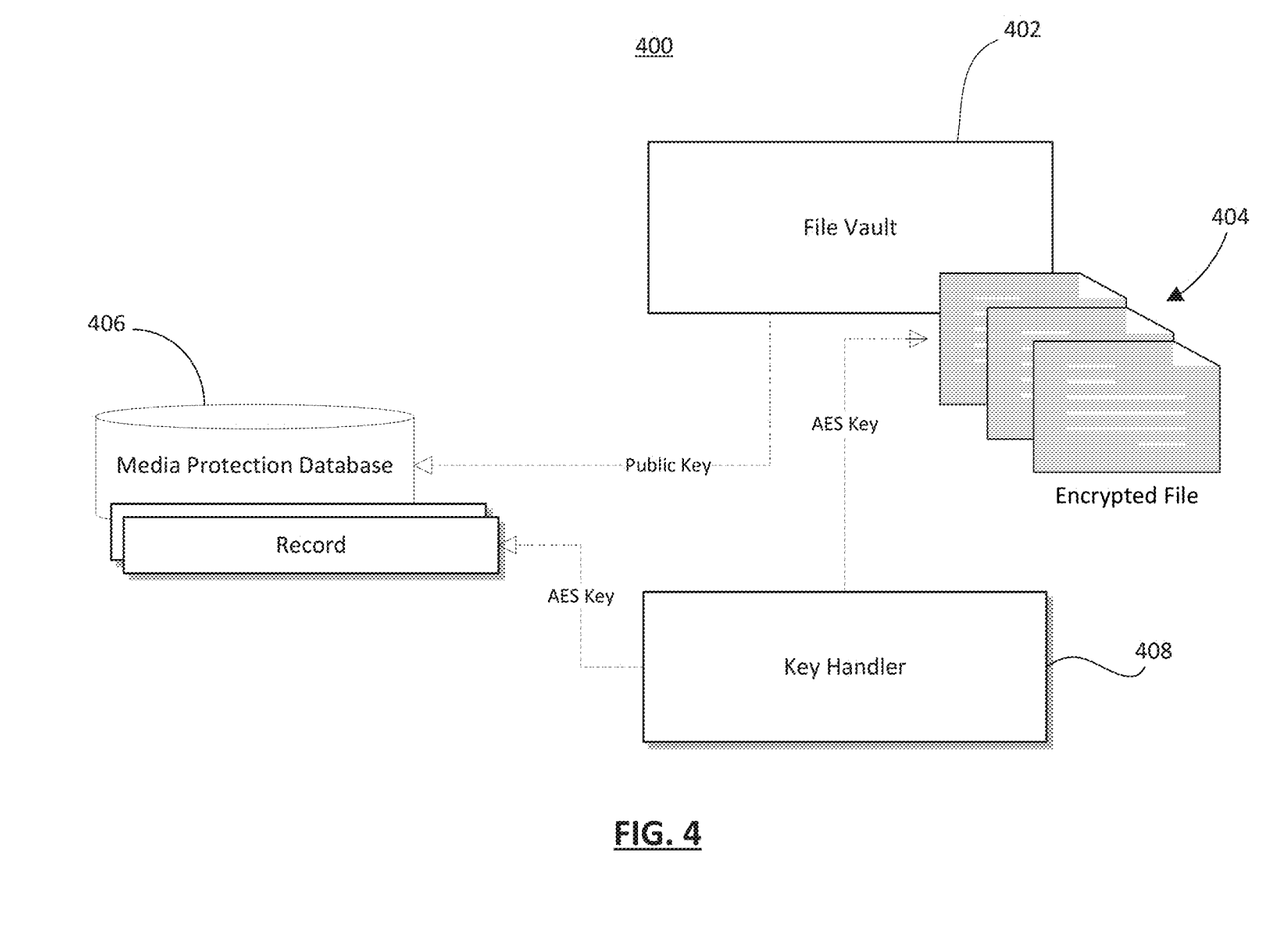
FIG. 4 shows an example configuration of a computing device for automatically encrypting files.

Reference is now made to FIG. 4, which shows, in block diagram form, an example configuration of a computing device 400 for automatically encrypting files. In this example, an encryption application manages the manual or automatic encryption and decryption of files on the computing device 400. The files are stored in a sandboxed portion of memory, sometimes termed a "file vault" 402. Files in the file vault 402 are stored in encrypted form, as indicated by encrypted files 404. Each encrypted file 404 in this example is encrypted with its own unique encryption key. The encryption key may be generated using a symmetric key method in some cases. In this example, the encryption key is an AES (Advanced Encryption Standard) key of a suitable key length. Other encryption mechanisms or key types may be used in other implementations.

The computing device 400 may include a media protection database 406 that stores records of files in the file vault 402. In particular, the records may include, in some examples, a unique identifier, an encrypted file name, an actual file name, an original location or source, and the AES key. The AES key may, itself, be stored in the record in encrypted form. The key may be encrypted with a key linked to the global password for the file vault 402. The key for encrypting the AES key may be a public key part of a public-private asymmetric key pair.

The encryption application governing access to the file vault 402 may include an asymmetric key pair associated with locking and unlocking the file vault 402. The asymmetric key pair may be linked to a password that may be entered by a user, whether through a passphrase, biometrics, gesture, or in any other authentication scheme, including multi-factor authentication. The public key of the asymmetric key pair may be used to lock information in the media protection database 406. Entry of the password may enable generation of the private key to enable unlocking of the media protection database 406 and its records, and, therefore, recovery of the symmetric AES key for decrypting one of the encrypted files 404. The encryption application may include a key handler 408 for managing keys and, in particular, for obtaining the AES key from a record in the media protection database 406 and decrypting and accessing a corresponding one of the encrypted files 404.

The encryption application may also be involved in encrypting newly-created files, whether through manual user instruction or automatic encryption as described above. For example, in the case of automatic encryption, the encryption application may recognize or receive external instruction to encrypt a particular file. In response it may generate, such as through the key handler 408, a new AES key. It may further obtain the asymmetric public key, which may be stored in memory and accessible to the key handler 408. The encryption application may cause encryption of the newly-created file as a new encrypted file 404, and its storage in the file vault 402. It may also cause deletion of any unencrypted version of the file, if any, located elsewhere in persistent or temporary memory. The encryption application may further cause creation of a new record in the media protection database 406, the new record containing details regarding the newly-created file and, in particular, the AES key for decrypting the file. That AES key, or the whole or part of the record containing the AES key, may by encrypted using the public key prior to storage in the media protection database 406.

Although not illustrated, the computing device 400 may, in some implementations, further include a key database or other store containing key material such as at least the private keys associated with the public keys used to encrypt the AES keys. In some instances, the key database or key store may enable key recovery mechanisms. In some instances, a user password is authenticated and that enables access to a particular entry in the key database to recover the private key and thereby decrypt the AES key.

Figure 5:
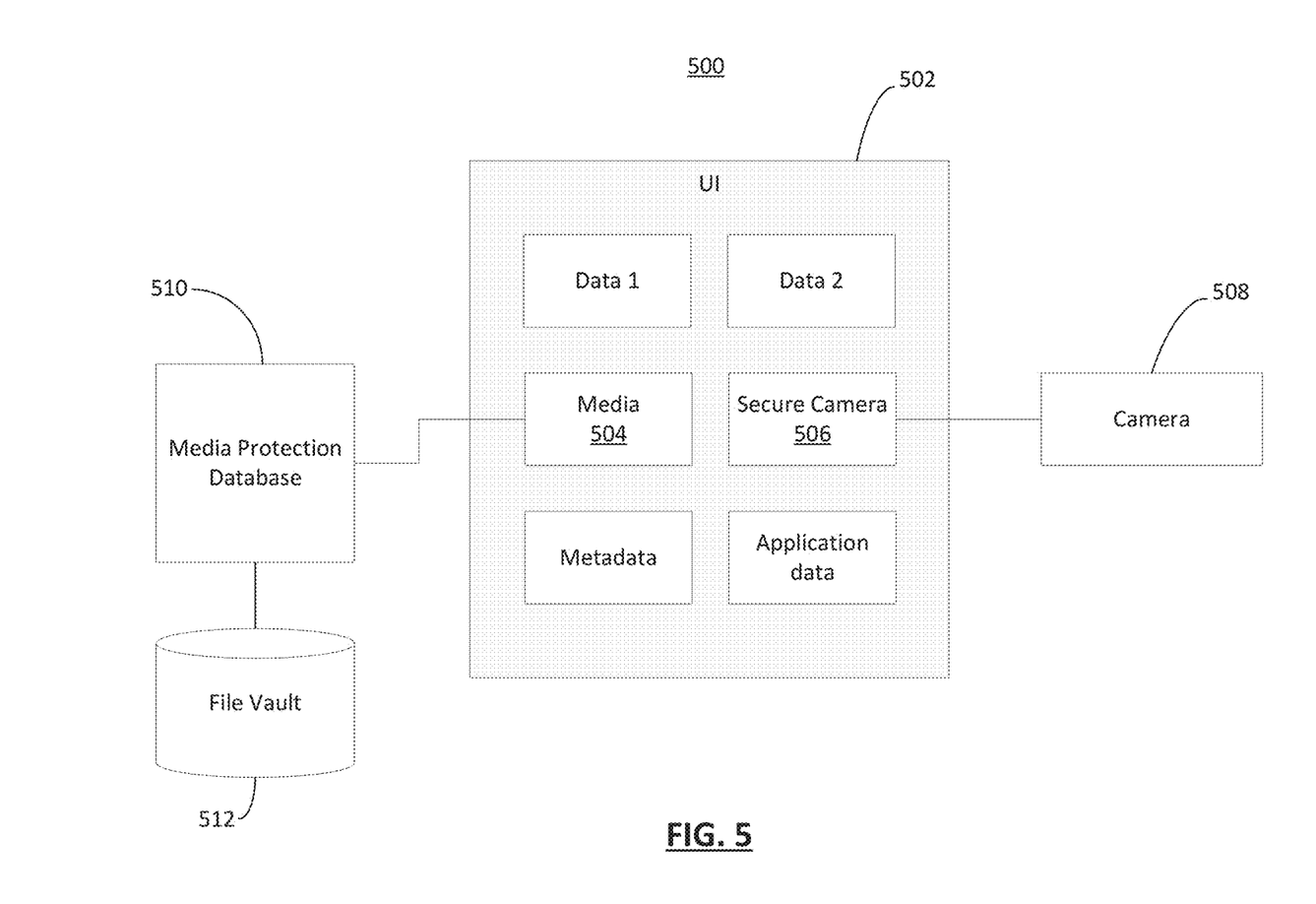
FIG. 5 shows, in block diagram form, one example partial architecture of a computing device for automatically encrypting files.

Reference is now made to FIG. 5, which shows, in block diagram form, one example partial architecture of a computing device 500 for automatically encrypting files. The architecture includes a user interface function 502 for accessing and interacting with encrypted file storage. The user interface function 502 may provide operations relating to, for example, securely encrypting data or metadata, for example data relating to an application or a particular media type, or other such functions in some implementations. The user interface function 502 may provide operations relating to media encryption, as indicated by reference numeral 504. The media encryption operation may provide functionality for accessing encrypted media via in a media protection database 510, where the media or other files are stored in a file vault 512 in encrypted form, and the media protection database 510 contains the password-protected metadata and key material to access the encrypted files, as described in connection with FIG. 4.

The user interface function 502 may also provide a secure camera operation 506. The secure camera operation 506 may interact with a normal camera application 508 on the computing device, and may cause modifications to the operation of the normal camera application 508. In particular, the secure camera operation 506, if invoked, may cause capture of any images or video using the normal camera application 508 to be stored in the file vault 512 in encrypted format. In this regard it prevents the normal camera application 508 from storing any capture image or video in unencrypted memory except, in some cases, temporary cache memory for a time before the image or video is encrypted and removed from the temporary cache memory. It may further prevent the normal camera application 508 from storing any thumbnails of the images or video and/or registering the captured images or video in a list or record of recent images or other such records.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computing device comprising:
a processor;
a memory; and
an automatic file encryption application stored in the memory and containing processor-executable instructions to automatically encrypt a file, wherein the instructions, when executed by the processor, are to cause the processor to:
store a hashed characteristic associated with likely sensitive content based on a communication received from a remote server specifying the hashed characteristic and based on a usage pattern, wherein the usage pattern is derived at the remote server from previous file encryption operations on other computing devices encrypting different files having the characteristic,
detect creation of the file,
generate a hash of at least a portion of the file,
determine that the file contains sensitive content based upon the hash matching the hashed characteristic, and
responsive thereto, encrypt the file.

2. The computing device of claim 1, wherein the characteristic of the file includes geo-location data associated with creation of the file.

3. The computing device of claim 1, wherein the characteristic of the file includes timestamp data associated with creation of the file.

4. The computing device of claim 1, wherein the usage pattern is determined from previous file encryption operations encrypting different files having the characteristic on the computing device.

5. The computing device of claim 1, wherein the instructions, when executed, are to cause the processor to:
receive data regarding previous file encryption operations on other computing devices and associated file characteristics;
identify the usage pattern based on one or more of the associated file characteristics common to the previous file encryption operations; and
identify the characteristic from the usage pattern.

6. The computing device of claim 1, wherein the instructions, when executed, are to cause the processor to encrypt by at least one of moving the file to a local disk-based encrypted memory and moving the file to a cloud-based encrypted memory.

7. The computing device of claim 1, wherein the file comprises one of a photo, a video, or an audio recording.

8. The computing device of claim 1, wherein the computing device is a mobile device.

9. A computer-implemented method of automatically encrypting a file stored on a computing device, the method comprising:
storing a hashed characteristic associated with likely sensitive content based on a communication received from a remote server specifying the hashed characteristic and based on a usage pattern, wherein the usage pattern is derived at the remote server from previous file encryption operations on other computing devices encrypting different files having the characteristic;

detecting creation of the file;

generating a hash of at least a portion of the file;

determining that the file contains sensitive content based upon the hash matching the hashed characteristic; and responsive thereto, encrypting the file.

10. The computer-implemented method of claim 9, wherein the characteristic of the file includes geo-location data associated with creation of the file.

11. The computer-implemented method of claim 9, wherein the characteristic of the file includes timestamp data associated with creation of the file.

12. The computer-implemented method of claim 9, wherein the usage pattern is determined from previous file encryption operations encrypting different files having the characteristic on the computing device.

13. The computer-implemented method of claim 9, further comprising identifying the characteristic of the file based on a threshold number of other computing devices performing the previous file encryption operation with respect to a respective file having the characteristic.

14. The computer-implemented method of claim 9 further comprising:

receiving data regarding previous file encryption operations on other computing devices and associated file characteristics;

identifying the usage pattern based on one or more of the associated file characteristics common to the previous file encryption operations; and identifying the characteristic from the usage pattern.

15. The computer-implemented method of claim 9, wherein the encrypting includes at least one of moving the file to a local disk-based encrypted memory and moving the file to a cloud-based encrypted memory.

16. The computer-implemented method of claim 9, wherein the file comprises one of a photo, a video, or an audio recording.

17. A non-transitory computer-readable storage medium storing processor-executable instructions to automatically encrypt a file on a computing device, wherein the processor-executable instructions, when executed by a processor of the computing device, are to cause the processor to:

store a hashed characteristic associated with likely sensitive content based on a communication received from a remote server specifying the hashed characteristic and based on a usage pattern, wherein the usage pattern is derived at the remote server from previous file encryption operations on other computing devices encrypting different files having the characteristic, detect creation of the file, generate a hash of at least a portion of the file, determine that the file contains sensitive content based upon the hash matching the hashed characteristic, and responsive thereto, encrypt the file.

18. The non-transitory computer-readable storage medium of claim 17, wherein the characteristic of the file includes geo-location data associated with creation of the file.

* * * * *